United States Patent [19]

Horst et al.

[11] 4,044,939

[45] Aug. 30, 1977

[54] METHOD OF FABRICATING DIFFRACTION GRATING MASTERS AND APPARATUS THEREFOR

[75] Inventors: William R. Horst, Dayton; James L. McNaughton, Kettering; Charles F. Mort, Xenia, all of Ohio

[73] Assignee: NCR Corporation, Dayton, Ohio

[21] Appl. No.: 611,377

[22] Filed: Sept. 8, 1975

[51] Int. Cl.$^2$ .................... G02B 27/38; B23P 3/24
[52] U.S. Cl. .................... 228/176; 96/27 H; 96/38.3; 264/1; 350/162 SF; 29/458
[58] Field of Search .................... 264/1; 425/810; 350/162 R, 162 SF, 3.5; 346/77 R; 228/176; 96/27 H, 38.3

[56] References Cited

U.S. PATENT DOCUMENTS

| | | | |
|---|---|---|---|
| 2,444,314 | 6/1948 | Ruggieri | 425/810 X |
| 2,875,543 | 3/1959 | Sylvester et al. | 264/1 X |
| 3,045,531 | 7/1962 | Prescott | 350/162 R |
| 3,388,735 | 6/1968 | Sayce | 96/38.3 X |
| 3,484,154 | 12/1969 | Swing et al. | 96/38.3 X |
| 3,619,024 | 11/1971 | Frattarola | 264/1 X |
| 3,917,378 | 11/1975 | Gale | 350/3.5 |

Primary Examiner—James L. Jones, Jr.
Assistant Examiner—K. J. Ramsey
Attorney, Agent, or Firm—J. T. Cavender; Albert L. Sessler, Jr.; Elmer Wargo

[57] ABSTRACT

A method of producing a diffraction grating master which comprises exposing a plurality of reduced first grating patterns on a light sensitive layer in conformance with a predetermined code; processing the light sensitive layer to produce first gratings therein; exposing a plurality of reduced second grating patterns on the light sensitive layer (superimposed on the first gratings) and repeating the processing step to produce the second gratings; vacuum depositing a layer of silver on the superimposed first and second gratings; electroplating a layer of nickel on the silver layer on the superimposed gratings; separating the resulting nickel-silver layer from the light sensitive layer; and reinforcing the nickel-silver layer (formed in the pattern of the first and second gratings) for use as an embossing master. A special electroplating fixture used in the electroplating step insures that the nickel layer being deposited lies flat without "peeling".

11 Claims, 12 Drawing Figures

METHOD OF FABRICATING DIFFRACTION GRATING MASTERS AND APPARATUS THEREFOR

BACKGROUND OF THE INVENTION

This invention relates to a method and apparatus for producing a diffraction grating master for use in producing optical gratings by an embossing technique.

Recent developments in financial systems, credit systems, security systems, and funds transfer systems rely heavily on the use of record media or "credit cards" having magnetic stripes or tracks thereon with various data like account number, credit limits, credit status, credit available for use, and the like being recorded magnetically on the stripes. Such systems have to be designed to avoid or minimize the fraudulent use of such credit cards.

One of the ways in which fraudulent use of such credit cards is made is to counterfeit the cards by mass reproduction techniques which "skim" or transfer the data magnetically recorded on a valid card to a fraudulent one.

The problem of trying to prevent the unauthorized duplication of or use of valid credit cards used in financial systems and the like is a very extensive one as evidenced by the variety of different techniques tried to avoid the problem. Some representative techniques are disclosed in the following U.S. Pat. Nos. 3,604,901; 3,620,590; 3,644,716; 3,759,179; 3,790,754; 3,808,404; 3,831,008; 3,401,830; 3,697,729, and 3,691,527.

A copending application Ser. No. 588,937, filed on June 20, 1975 and assigned to the same assignee as this application discloses a system for checking on the validity of credit cards used in financial systems and the like by using a credit card which has first data recorded thereon in the form of optical gratings and second data which is recorded in a magnetic stripe or track on the card. When the card is used in such a system, the first data is read by an optical grating reading means and the second data is read by a conventional magnetic track reader. The first and second are then compared to determine the validity of the card being used in the system, and a validity signal is issued depending upon whether the card was valid or not. Because the first data is made up of optical gratings which are embedded in the credit card itself, the optical gratings are tamperproof and can not be easily skimmed or counterfeited as data which is magnetically recorded on a card can be. Thus, a system was disclosed in said copending application which prevented the mass counterfeiting of valid credit cards.

A second copending application Ser. No. 611,378 filed by William R. Horst, Charles F. Mort and William J. Hale, on the same date as this application and assigned to the same assignee as this application, discloses an optical identification system including a reader for reading superimposed optical gratings located in a grating plane on a record medium. This optical identification system and reader are an improvement on the system and reader disclosed in said first copending application in that the use of superimposed gratings enhances the security of the system, and the reader is less susceptible to erroneous readings when the gratings being read are positioned slightly out of the associated reading or grating plane.

This invention relates to a method and apparatus used for producing a diffraction rating master for producing superimposed optical or diffraction gratings by an embossing technique.

Most of the prior art techniques for producing diffraction gratings utilize ruling engines; one such ruling engine is shown in U.S. Pat. No. 3,382,761, for example. A second prior art technique for producing an optical diffraction grid employs photographic and chemical machining techniques as shown in U.S. Pat. No. 3,728,117.

One of the problems with producing superimposed diffraction gratings by the ruling engine technique is that generally only soft metals like aluminum or silver can be ruled thereby, and consequently, diffraction rating masters made from such metals are not sufficiently durable when used to produce diffraction gratings by an embossing technique. Also, when superimposed gratings are made by a ruling engine, the grooves of one of the gratings seem to "chip" or tear into the grooves of the other, especially when gratings having a high line pitch or number of lines per mm. are made.

None of the references cited discloses the method and apparatus of this invention for producing a diffraction grating master which in turn can be used for producing diffraction gratings by an embossing technique.

SUMMARY OF THE INVENTION

The method of this invention comprises providing a surface having a grating means formed therein, and in one preferred embodiment thereof, this is accomplished by exposing a grating pattern means on a light sensitive layer; processing said light sensitive layer to form a grating means in the light sensitive layer corresponding to the grating pattern means; and the method further comprises: depositing a thin layer of material on the processed light sensitive layer to conform to the grating means formed in the light sensitive layer; and reinforcing the thin layer of material with a support means to enable the resulting structure to be used as an embossing tool. A special frame means is used in the depositing step to prevent the thin layer of material from curling during the depositing step. A special apparatus is also used during the reinforcing step.

DETAILED DESCRIPTION OF THE INVENTION

Before preceeding with a detailed discussion of the steps for producing a grating master according to this invention, it seems appropriate to discuss, in a general way, the basic steps involved therein.

The first basic step is to expose a grating pattern means on a light sensitive layer. The grating pattern means is initially prepared from a precision line drawing which is subsequently, considerably reduced in size and eventually further reduced in the exposing step which is effected on a high precision projector or reducing camera means.

After the light sensitive layer is exposed, it is processed by photochemical techniques to physically form a grating means (corresponding to the grating pattern means) in the light sensitive layer.

After the grating means is formed in the light sensitive layer, a thin layer of metal is deposited on the grating means on the light sensitive layer to physically conform to the grating means. This is accomplished by vacuum depositing a submicron layer of silver over the grating means and thereafter electroplating a thin layer of metal thereon. A special fixture facilitates electroplating the thin layer of metal by having it lie flat in conformity with a backing plate without buckling during the electroplating operation.

After the thin layer of metal is formed on the light sensitive layer, it is reinforced to enable it to be used as an embossing master or tool. This is accomplished by peeling the thin layer of metal from the light sensitive layer and mounting the thin layer of metal on a support member. Because the thin layer of metal has the diffraction grating means formed thereon, corresponding to the grating means formed in the light sensitive layer, it can be used to form diffraction gratings in material (like plastic, for example) by embossing or similar techniques.

Figure 1:
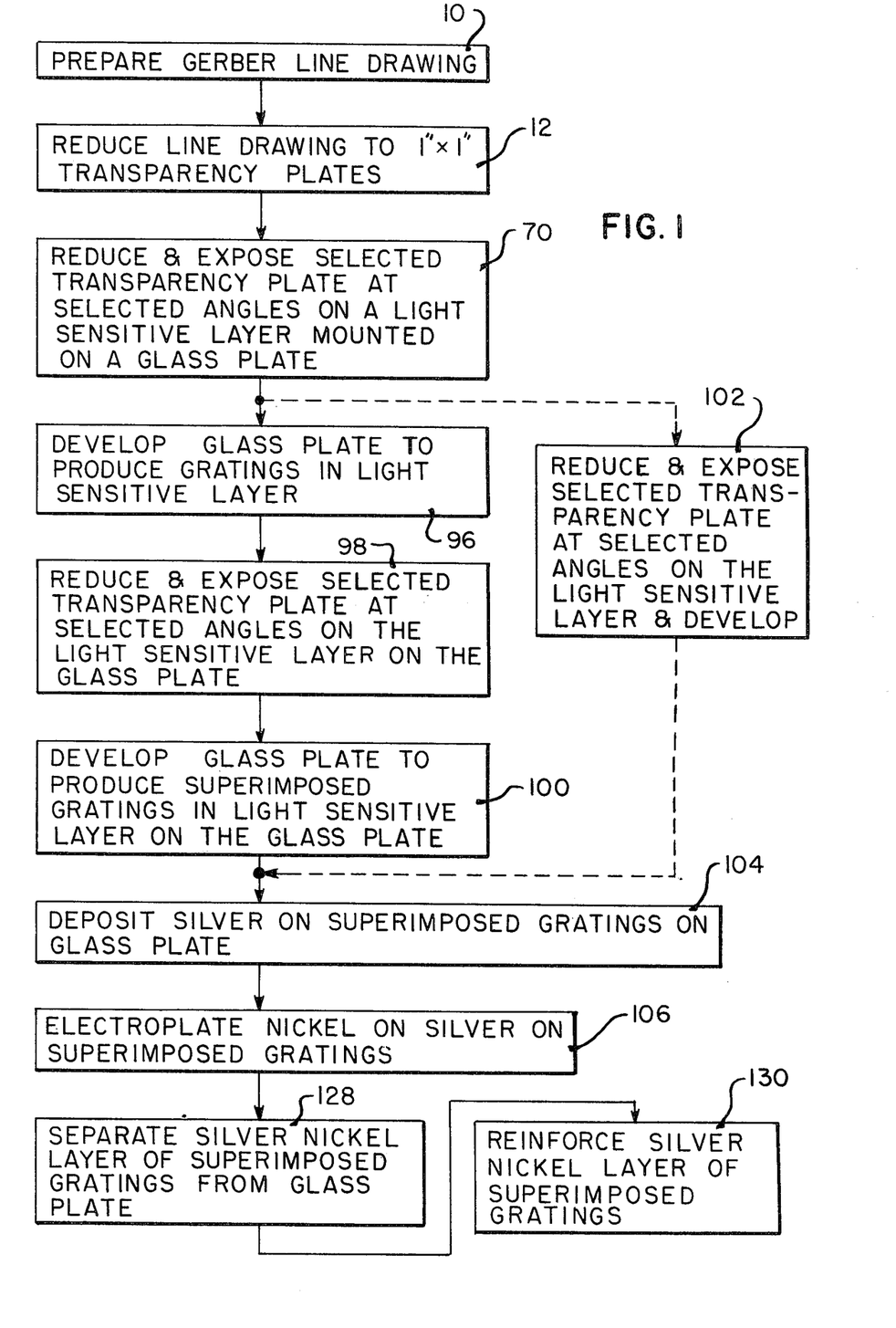
FIG. 1 is a block diagram showing the basic steps in a process for producing a grating master according to this invention.

FIG. 1 is a block diagram showing the basic steps in the process of producing a grating master according to the principles of this invention. The grating master may contain diffraction gratings having a number of lines per mm. ranging from about 200 to 800. The grating master selected to portray this invention contains diffraction gratings having 600 lines per mm. and 350 lines per mm. although various other combinations could be used. The initial step in the process is to produce a greatly-enlarged, precision, parallel-line drawing on a large sheet of film by a conventional Gerber Plotter as shown in block 10 of FIG. 1. In the embodiment to be described herein, two large rectangular sheets of film 30 × 40 inches are used, with one being provided for the 600 lines/mm. grating and the other being provided for the 350 lines/mm. grating which said gratings are to be ultimately produced through a series of size reductions.

As a typical illustration, one 30 × 40 inches sheet of film has a plurality of parallel black lines, 0.005 inches wide and 35 inches long which are drawn parallel to the 40 inch side of the film, with the lines being spaced on 0.0130 inch centers, there being at least 2,231 such lines drawn on the sheet of film for the 600 lines/mm. grating. The second 30 × 40 inches sheet of film has a plurality of parallel black lines 0.010 inch wide an 35 inches long which are drawn parallel to the 40 inch sides of the film, with the lines being spaced on 0.0230 inch centers, there being at least 1260 such lines drawn on the second sheet for the 350 lines/mm. grating. The most critical dimension in the first and second drawings is the center-to-center spacing of the lines.

Figure 2:
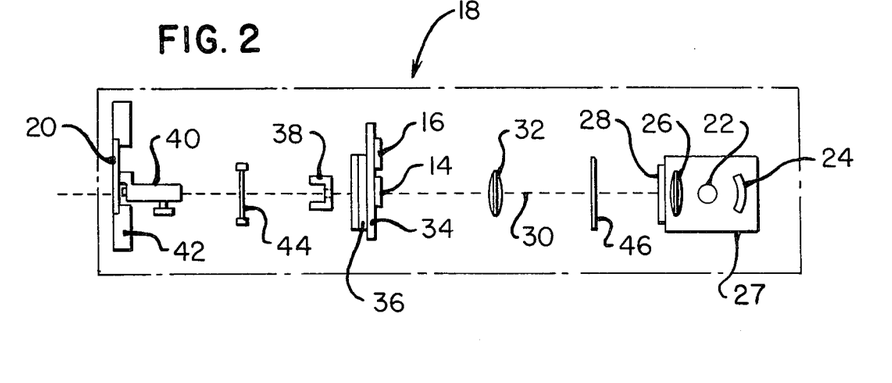
FIG. 2 is a schematic diagram of a projection apparatus for exposing selected grating patterns on to a light sensitive layer.

The first and second sheets of film with the line drawings thereon are then placed separately in a conventional, large, precision, photographic-reduction camera or reduction system as shown in block 12 in FIG. 1 where they are reduced exactly 20 times in size and conventionally developed to produce 1.000 inch square images or patterns on two separate two inch square, high-resolution, glass, photographic slides or plates 14 and 16 respectively, as shown in FIG. 2. At this stage, the plate 14 is a photographic master having 60 lines per mm. and the plate 16 is a photographic master having 35 lines per mm. as a result of the reduction process shown in block 12 of FIG. 1.

FIG. 2 is a schematic diagram of a high resolution imaging facility or projection apparatus designated generally as 18. The apparatus 18 provides a critical reducing step in converting the photographic master plate 14 from the illustrated 60 lines per mm. to a final grating of 600 lines per mm. and similarly, in converting the photographic master plate 14 from the illustrated 35 lines per mm. to 350 lines per mm. The output of the apparatus 18 is an optically exposed photoresist coating on a glass plate 20, containing images of all gratings of a diffraction grating master, superimposed in their proper location and format.

The projection apparatus 18 includes a high pressure mercury lamp 22, reflecting mirror 24, and collecting lens 26 which are located within a housing 29. A solenoid operated light gate 28 closes the light path along an optical axis 30 during the loading of a glass plate 20 having a light sensitive coating or photoresist thereon. A second lens 32 is used to illuminate the photographic plates 14 and 16 which are positioned on a conventional carrier stage 34 to enable either of the plates 14 or 16 to be positioned at the optical axis 30, and the carrier stage 34 is part of a conventional rotary indexing means 36 which permits the selected plate 14 or 16 to be rotated about the optical axis 30 to any desired, precise angle. A changeable aperture 38, located behind the indexing means 36, is used to control the final shape and size of grating formed on the photoresist on the glass plate 20. An imaging lens 40 is positioned next to the glass plate 20 and is a special reducing lens capable of a 10 to 1 reduction and a theoretical resolution of over 1,000 lines per mm. The glass plate 20 is detachably mounted on three ball locating studs (not shown) on a conventional X-Y indexing mechanism 42, and in the embodiment shown, is capable of incrementing the glass plate 20 in a horizontal or X direction to locate each grating exposed on the plate 20, and also provides a micrometer adjustment in the vertical or Y direction to locate each grating exposed in a second row below the first row on the plate 20. Naturally, the amount of incrementing of the indexing means 42 and the size of the exposures upon the glass plate 20, and their particular arrangement thereon are dependent upon the particular application desired. A shutter 44, near the imaging lens 40, accurately controls the exposure time for the plates 14 and 16, and a ultraviolet filter 46 limits the light wavelength to the band of light which is compatible with the particular photoresist which is used on the glass plate 20.

The projection apparatus 18 (FIG. 2) provides precision control of the position of lens 40, maintaining the spacing between the imaging lens 40 and the glass plate 20 to an accuracy of approximately 5 millionths of an inch before each image exposure on the plate 20.

As stated earlier herein, the particular arrangement and size of the diffraction gratings and the coding arrangement selected for a particular application will determine how the various diffraction grating patterns are exposed on the light sensitive layer on the glass plate 20 by the projection apparatus 18 shown in FIG. 2. To illustrate one such embodiment, attention is directed to FIGS. 3 and 4.

Figure 3:
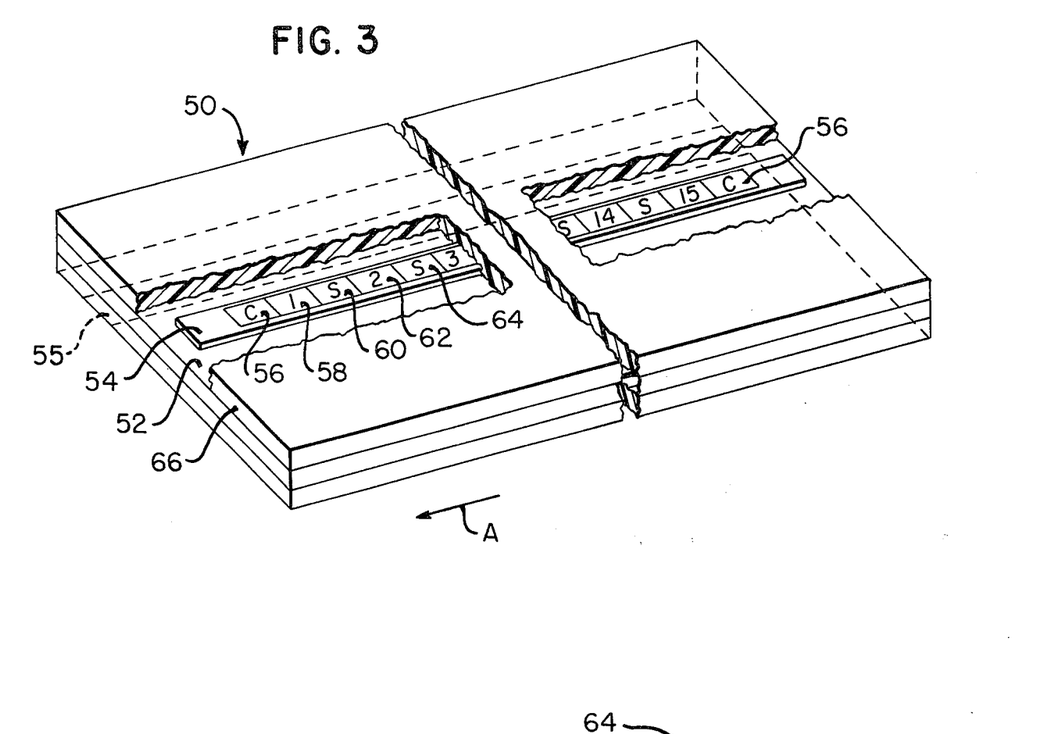
FIG. 3 is a perspective view of a record medium like a credit card having a plurality of superimposed diffraction gratings formed on an aluminized strip of plastic which is imbedded in the credit card.
Figure 4:
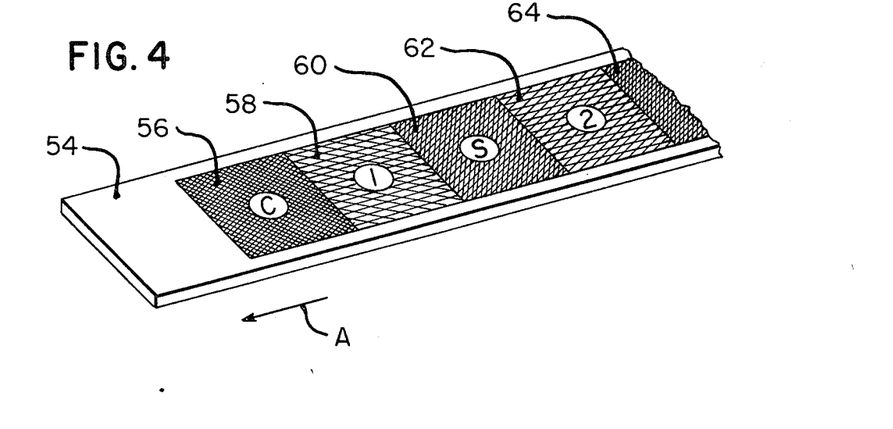
FIG. 4 is an enlarged view of the strip of plastic shown in FIG. 3 to show additional details thereof.

FIG. 3 shows a record medium like a credit card 50 having a body portion 52 which has a strip 54 of aluminized plastic positioned thereon as shown. The strip 54 has a plurality of superimposed optical gratings formed thereon like 56, 58, 60, 62 and 64 as shown in the enlarged view shown in FIG. 3. The particular coding arrangement shown in FIG. 3 is typically comprised of various combinations of a 600 lines per mm. grating and a 350 lines per mm. grating which are superimposed at predetermined angles relative to the direction of card feed as shown by arrow A and as described in said second copending application Ser. No. 611,378. The grating 56, also marked with an encircled C, is a control grating, and there is one such grating at the beginning and end of the strip 56. The gratings like 58 and 62, also marked with an encircled 1 and 2, respectively, represent data characters which are encoded with said particular coding arrangement and may represent the characters 1 and 2 for example, as described in said second copending application. Each character on the strip 54 is separated from the next character by a diffraction grating like 60 and 64, which provide a separation for the characters like 58, 62 being read. The plastic strip 54 is sealed in the card 50 by a transparent layer 66 of plastic which makes the gratings on the strip 54 tamperproof and enables them and a conventional magnetic stripe 55 to be read as described in said second copending application. The particular credit card 50 is described mainly to show how the ultimate design of record medium on a credit card like 50, determines how the particular diffraction gratings will be exposed on the light sensitive layer of photoresist on the glass plate 20 shown in FIG. 2.

Figure 5:
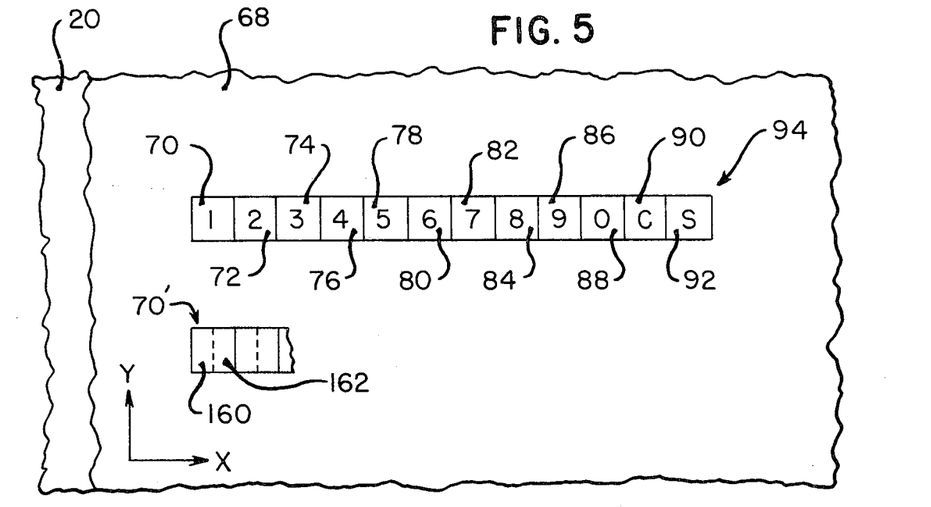
FIG. 5 is a schematic showing of a portion of a glass plate having a light sensitive layer thereon and which plate is positioned in the projection apparatus shown in FIG. 2.

The glass plate 20 has a layer of light sensitive material or photoresist 68 (FIG. 5) deposited thereon by conventional techniques. In the embodiment described, the photoresist 68 deposited may be type AZ-1350 or type AZ-111 photoresist manufactured by the Shipley Company of Newton, Mass., or type KTFR manufactured by Eastman Kodak Co. of Rochester, N.Y., which photoresist was deposited on the glass plate 20 in accordance with the manufacturer's instructions. Care should be taken to avoid contamination and scratching of the photoresist coating 68 during handling and preparation of the glass plate 20.

The step of reducing and exposing the patterns on a selected plate 14 or 16 at selected angles on the photoresist 68 is shown as block 70 in FIG. 1 and is effected while in a darkroom while using the projection apparatus 18 shown in FIG. 2. The plate 20 is placed in the X-Y indexing mechanism 42 so that the photoresist 68 thereon faces the lamp 22, and the plate 20 is held securely and accurately positioned in the mechanism 42. The aperture 38 is selected to obtain the desired format or shape of the exposure on the photoresist 68; and the light control gate 28 is opened to permit focusing of the lens 40. The light gate 28 is generally used to reduce light in the developing room during changes of the plate 20. The particular plate 14 or 16 is then selected in conformance with a predetermined code and positioned at the predetermined angular orientation on the rotary indexing means 36 in conformance with said code. After the indexing means 42 is moved to position the glass plate 20 along the optical axis 30 to receive the first exposure, the exposure is made by opening the shutter 44. In the embodiment shown, for example, the exposure time for plate 14, having the 600 lines per mm. grating thereon, is typically 0.9 to 1.0 seconds, the exposure time for the plate 16, having the 350 lines per mm. grating thereon, is 0.5 to 0.7 seconds. Naturally, the exposure times are dependent upon the type of photoresist coating 68 used and the condition of the lamp 22, and therefore, the times given are guides to be used in obtaining the optimum exposure through some experimentation. After the first exposure 70 (FIG. 5) is made, the X-Y indexing mechanism 42 is actuated to move the glass plate 20 secured thereto along the X direction to align the second exposure area 72 (FIG. 5) with the optical axis 30. The particular plate 14 or 16 is selected and oriented on the rotary indexing means 36 in accordance with said predetermined code for the second exposure, and thereafter, the shutter 44 is opened to expose the photoresist 68 as previously described. The remaining areas 74, 76, 78, 80, 82, 84, 86, 88, 90 and 92 are similarly exposed to complete a line of exposures designated generally as 94, and thereafter the X-Y indexing means 42 may be indexed in the Y direction to similarly expose a second line of exposures on the photoresist 68 if desired. The exposures 70-88 (FIG. 5) represent characters 1-9 and 0 and the exposures 90, 92 (FIG. 5) correspond to the control code 56 and space code 60 (FIG. 4) respectively.

After the first exposures of diffraction gratings are made on the line 94 of exposures (FIG. 5), the glass plate 20 is removed from the projection apparatus 18 and the plate 20 is developed to produce diffraction gratings in the photoresist 68 as shown by the block 96 in FIG. 1. In the embodiment described, the plate 20 was placed in a developing solution of the type recommended by the manufacturer of the particular photoresist selected, and agitated for a time period corresponding to the manufacturer's instructions. In general, the optimum depth of the gratings in the photoresist 68 must be somewhat deeper than what is required in the finished product. For example, one use of the grating master which is developed according to this invention is to use it as an embossing tool in an embossing process to form the gratings in an aluminized plastic like Mylar manufactured by E. I. duPont Company of Maryland. The embossing process will be improved by an increased depth of the gratings in the grating master; consequently, a depth of grating in excess of 15 microinches is desirable in the photoresist 68 on the glass plate 20. After the photoresist coating 68 was so developed, the plate 20 was rinsed in distilled water and dried with a jet of nitrogen and argon gas as is typically done.

After the photoresist coating 68 on plate 20 is developed as described in the previous paragraph, the plate 20 is again placed in the projection apparatus 18 to expose the areas 70-92 (FIG. 5) with a second series of diffraction gratings to produce the superimposed diffraction gratings in accordance with said predetermined code as shown by the block 98 in FIG. 1.

After the second series of diffraction gratings is exposed over the line 94 of exposure areas 70-92 (FIG. 5) in accordance with the techniques already described, the glass plate 20 is removed from the projection apparatus 18 and the photoresist coating 68 thereon is developed as previously described and as shown by block 100 in FIG. 1.

As an alternate step, the first and second series of diffraction gratings may be exposed on line 94 on the photoresist coating 68 as shown by block 102 (FIG. 1) and then simultaneously developed to produce the superimposed diffraction gratings in one developing step; however, the superimposed diffraction gratings in the photoresist coating 68 appear to be more sharply defined when they are done in separate steps as outlined in blocks 70, 96 and 98 of FIG. 1.

After the first and second series of superimposed diffraction gratings are developed in the photoresist coating 68 on plate 20, a conducting layer of metal is vacuum deposited thereover as shown by block 104 in FIG. 1. The plate 20 with the developed photoresist coating 68 thereon is placed in a bell jar to conventionally vacuum deposit a sub-micron layer of about 0.1 microns of silver over the superimposed diffraction gratings on the photoresist 68 to conform with the diffraction gratings thereon and to provide a conducting layer thereon to enable a thicker layer of reinforcing material to be later deposited thereon by electroplating techniques.

Figure 6:
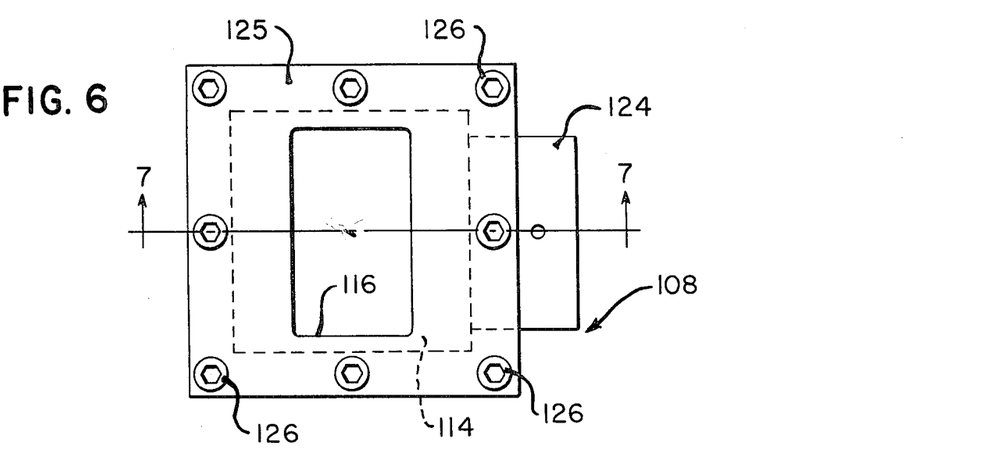
FIG. 6 is a plan view of a frame means used in electroplating a thin layer of metal on superimposed diffraction gratings.
Figure 7:
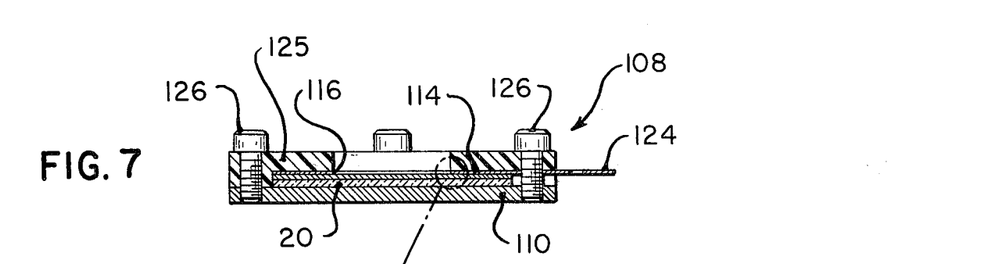
FIG. 7 is a cross-sectional view, taken along the line 7—7 of FIG. 6 to show additional details of the frame means.

After the photoresist 68 on plate 20 has the conducting layer of silver vacuum deposited thereon, it is ready to have a layer of tough material like nickel deposited thereover as shown by block 106 in FIG. 1. An important feature of this invention includes the use of a special plating frame means designated generally as 108 and shown in FIGS. 6 and 7; however, before describing the frame means 108, it is important to discuss the reason for its use. One of the problems encountered in attempting to electroplate a layer of nickel on the photoresist 68 on plate 20 was that during the electroplating process, a tensile stress appeared to build up in the plated layer (photoresist) even though the plating procedure was formulated to cause a minimum amount of stress therein. The stresses induced in the photoresist 68 caused the edges of the photoresist to warp away from the supporting glass plate 20, as the stresses induced exceeded the bond strength of the photoresist 68 to the glass plate 20. The plated layer (photoresist 68) would then curl away from the surface of plate 20, thereby destroying the flatness of the plated photoresist 68, causing the plating material to deposit on the wrong side of the photoresist 68. The frame means 108 was developed to prevent the warping of the photoresist 68 during the plating process.

Figure 8:
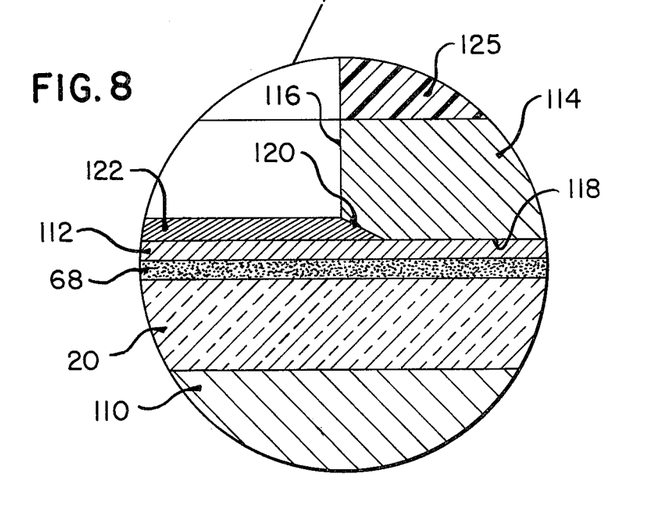
FIG. 8 is a greatly enlarged view in cross section of the circled portion of FIG. 7 showing how the frame means facilitates depositing a metal layer on the photoresist.

The frame means 108 (FIGS. 6 and 7) includes a support means or backing plate 110 to receive the glass plate 20 with the photoresist 68 and the layer 112 of silver deposited thereon as shown in the enlarged cross-sectional view in FIG. 8. An electrode means 114, made of brass, is generally planar having an opening 116 therein to expose the area of the element to be plated, which in this example, is the photoresist 68 with the superimposed diffraction gratings formed therein and the layer 112 of silver deposited thereover. The electrode means 114 has a contacting surface 118 (FIG. 8) which contacts the layer 112 of silver to provide an electrical connection therebetween during the plating process. The contacting surface 118 has a tapered surface 120, shown in FIG. 8, to enable the material which is to be plated on the layer 112 to form between the tapered surface 120 and the layer 112 of silver during the plating process, thereby locking the material which is deposited, (a layer 122 of nickel as shown in FIG. 8) in place under the electrode means 114. The electrode means 114 is a peripheral type electrode, made to encircle the element to be plated, with said tapered surface 120 extending completely around the opening 116 therein, and it also has an electrode or terminal portion 124 extending therefrom to enable the frame means 108 to be suspended therefrom and electrically connected while in a plating solution. A conventional plastic plating mask 125 prevents unwanted plating on the electrode means 114. Suitable fasteners 126 are used to detachably clamp the glass plate 20 between the electrode means 114 and the backing plate 110 as described.

After the glass plate 20 is mounted in the frame means 108, it is placed in an electroplating tank to deposit the nickel layer 122 over the layer 112 of silver. The particular plating solution used was a nickel sulfamate plating solution manufactured by the Harstan Chemical Company of New York City, N.Y. The complete details of the process may be found in the Harstan Technical Bulletin "Nickel Sulfamate", May 1973 and published by the Harstan Chemical Company. Best results were obtained when the bath temperature of the plating solution was kept between 28° and 35° centigrade, and the frame means 108 with the glass plate 20 therein was kept in the plating solution for a period of 2 hours with the plating current being 0.5 amp at a voltage of 12 volts D.C. to produce a 4 mils thickness of the layer 122 of nickel. After the layer 122 of nickel is deposited, the entire frame means 108 with the glass plate 20 therein is removed from the electroplating tank and is conventionally rinsed and dried. As an optional step, the frame means 108 with the layers 122 of nickel already deposited may be placed in a second electroplating tank wherein a thin layer of copper (not shown) of about 0.5 mils in thickness may be conventionally deposited over the layer 122 of nickel. The thin copper layer facilitates joining the grating master to its supporting bar. After the plating process was completed, the plate 20 was removed from the frame means 108 and conventionally washed and dried.

After the layer 122 of nickel and copper (if optionally added) are deposited on the silver layer on the photoresist 68 on the plate 20, the resulting composite layer (hereinafter called composite nickel layer) of metal is separated from the photoresist 68 as noted by the block 128 in FIG. 1. This is accomplished by very carefully scribing around the edges of the composite nickel layer and carefully peeling it from the photoresist 68. If carefully done, the photoresist 68 with the superimposed gratings therein may be reused in the plating solutions described to produce additional nickel/copper layers having the diffraction gratings therein corresponding to those in the photoresist 68. After the composite nickel layer is removed, it is conventionally cleaned and dried, and it is in reality, a composite nickel grating master 132, and is ready for the reinforcing procedure generally outlined in block 130 of FIG. 1.

Figure 9:
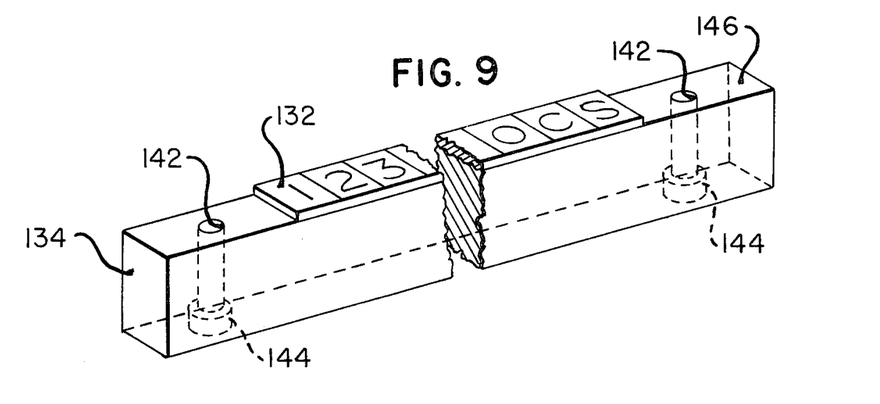
FIG. 9 is an enlarged view, in perspective, of one form of an embossing master made according to this invention.

After the composite nickel layer is removed from the photoresist 68 as described, it is reinforced to enable it to be used as an embossing tool. The composite nickel grating master 132 (hereinafter called grating master) which is shown in greatly enlarged perspective view in FIG. 9 has to be mounted flat on a reinforcing tool or supporting bar 134 over the entire surface thereof if it is to transfer the diffraction gratings thereon by an embossing technique to a thin plastic layer like strip 54 shown in FIG. 4.

Many methods of attaching the grating master 132 to the surface of a supporting bar were tried. In general, the attachment of the grating master 132 to the supporting bar must withstand high compressive loads and operating temperatures. Because surface protrusion between the grating master 132 and the supporting bar 134 cannot be permitted, adhesive bonding between these two elements appeared to offer the most promise. After numerous evaluations and tests, no plastic adhesives could be found, even from specialty manufacturers, which could meet these specifications. Welding, brazing and soldering techniques were next pursued, in that order. Spot welding and the use of a laser welder produced poor bonds and fractures of the grating master 132. Brazing or silver soldering required prolonged temperatures detrimental to the gratings on the grating master 132. High temperature (650° F) indium-alloy solders provided some success, but these temperatures tended to create troublesome surface oxides on the surface of the supporting bar 134 which was made of steel. Since lead can create metallurgical interactions with the nickel in the grating master 132, a tin/antimony alloy offered the best promise as a lower temperature solder. A 95% tin/5% antimony solder provides a liquidus temperature of 464° F and it becomes solid at 452° F. This narrow solid/liquid transition range is important in permitting lowest-temperature joining but highest-working temperature.

Investigation of observed phenomena led to the discovery that heating of the grating master 132 to 600° F for even short intervals (under 1 minute) hardened the nickel therein beyond its initially hard state (from an initial Rockwell hardness of C50 to approximately C56) and caused some embrittlement therein. This occurs with the clean nickel material and cannot be attributed to the solder alloy or attachment process. These temperatures are well below published hardening temperatures, but the effect has been proven. This excess hardening would promote crack propagation under high stress, causing the gratings to suffer a high scrap rate during the trim-to-size operation and resulted in numerous edge cracks along the trimmed edges of the grating master 132 which cracks would tend to propagate during use. This effect does not occur at working temperatures under 500° F. By controlling working temperatures, the grating masters 132 are now reliably solder bonded to their supporting bars (like 134) while maintaining the desired metallurgical properties thereof.

Figure 10:
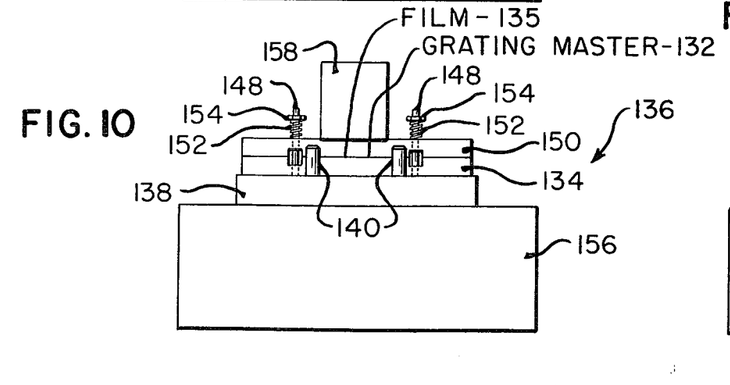
FIG. 10 is a side view, in elevation, of a fixture which is used in a reinforcing step of securing a grating master to a supporting block.
Figure 11:
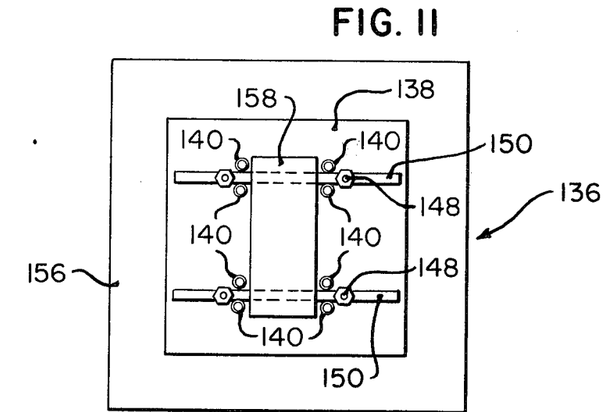
FIG. 11 is a top view of the fixture shown in FIG. 10.
Figure 12:
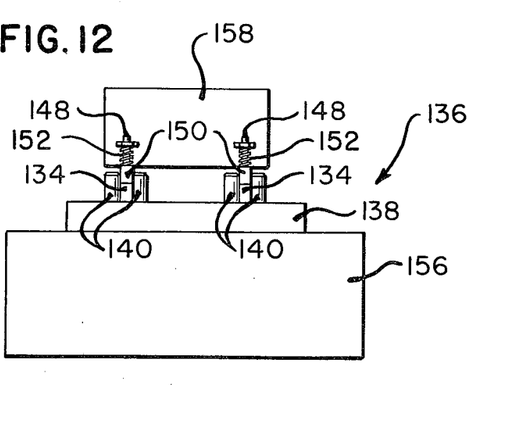
FIG. 12 is a right side elevational view of the fixture shown in FIG. 11.

The method of reinforcing the grating master 132 is accomplished by soldering it to a supporting bar like 134 with the aid of the apparatus designated generally as 136 and shown in FIGS. 10, 11 and 12. The apparatus 136 includes a guide block 138 having two sets of guide pins 140 upstanding therefrom, with four such pins being included in each set as is best shown in FIG. 11 to enable the supporting bar 134 to be aligned and supported during the soldering or solder bonding process. Two grating masters 132 may be simultaneously soldered to their associated supporting bars 134 as is best shown in FIG. 12. Each supporting bar 134 has holes 142 (FIG. 9) therein, with the lower side of the bar 134 being recessed as at 144 to receive the head of a bolt which passes through the associated hole 142 and enables the bar 134 to lie flat on the guide block 138. The top surface 146 of the supporting bar 134 is flat and parallel to the bottom surface thereof. With the aid of a soldering iron and a zinc chloride flux, the top surface 146 of each bar 134 is tinned with a 95% tin/5% antimony solder as previously described. After tinning, the solder layer on each supporting bar 134 is machined flat to avoid damage to the associated grating master 132. After the supporting bar 134 is so machined, a thin layer of zinc chloride flux is applied to the machined tinned surface thereon, and bolts 148 are passed therethrough as shown in FIGS. 10 and 11. Thereafter, the grating master 132 is positioned on top of the fluxed area of supporting bar 134, with the copper layer (if used) facing the bar, and a plastic strip of polyimide (shown as film 134 in FIG. 10) of about 0.005 inch thickness is positioned over the top surface of the grating master 132 to protect the gratings thereon. A pressure bar 150 with appropriate aligned holes therein is then placed over the bolts 148, and suitable springs 152 and nuts 154 are used to resiliently compress the grating master 132 and strip of plastic between the associated supporting bar 134 and pressure bar 150. The empty guide block 138 is then placed on a hot plate 156 which has been preheated to a temperature of 600° F, and the guide block is allowed to reach an equilibrium temperature which occurs after about 5 minutes. Due to radiation of heat from the guide block 138, its equilibrium temperature will not exceed 500° F. Each assembly consisting of a supporting bar 134 and pressure bar 150 with the grating master 132 and strip of plastic therebetween is installed between an associated set of pins 140 on the heated guide block 138 and a weight in the form of a block 158, weighing about 22 pounds for the embodiment shown, is placed over two such assemblies as shown in FIGS. 10, 11 and 12. The assemblies will begin to heat up, and as soon as the excess solder melts and is squeezed out from between the associated support bars 134 and grating master 132, the weight 158 is removed, and the two assemblies are removed from the guide block 138, permitting the assemblies to cool while being resiliently compressed by the associated springs 152. After the assemblies are cooled, they are disassembled and the surplus solder around the edges of the support bar 134 is trimmed off to complete the reinforcing of the grating master 132.

In the embodiment shown, the size of the gratings 56, 58, 60 etc. shown in FIG. 4 is approximately 0.1 inch square; however, the particular size selected will naturally depend upon the particular application desired.

In some situations, it may be desirable to expose each of the areas 70-92 (FIG. 5) in two steps instead of one as previously explained due to the format of the areas 70-92. For example, instead of making one exposure for area 70' (FIG. 5.) on the apparatus 18 (FIG. 2), it may be desirable to expose half the area of 70' as at 160 and then index the X-Y indexing mechanism 42 in the X direction and then expose the remaining area 70' as at area 162 to complete the complete exposure of area 70' which is equal in area to area 70 already described in line 94.

Naturally, the particular arrangement of the metal master 132 on the supporting bar 134 (FIG. 9) will depend upon how the combined structure is to be used as an embossing tool. One method and apparatus showing how diffraction gratings may be embossed on a strip of plastic to produce diffraction gratings thereon is shown in FIGS. 4 and 5 of said first named copending application. Because the particular technique employed for embossing may be conventional, no further discussion thereof is deemed necessary.

We claim:

1. A method of producing a diffraction grating master capable of producing superimposed diffraction gratings, comprising the steps of:
   a. exposing a first grating pattern means on a light sensitive layer;
   b. processing said light sensitive layer from step (a) to physically form a first grating means in said light sensitive layer corresponding to said first grating pattern means;
   c. exposing a second grating pattern means on said light sensitive layer from step (b);
   d. processing said light sensitive layer from step (c) to physically form a second grating means in said light sensitive layer corresponding to said second grating pattern means;
   e. depositing a thin layer of material on said layer from step (d) to physically conform to said first and second grating means on said light sensitive layer; and
   f. reinforcing said thin layer of material from step (e).

2. The method as claimed in claim 1 in which said depositing step (e) comprises:
   g. depositing a submicron layer of electrically conducting material on said light sensitive layer from step (d) to physically conform to said first and second grating means on said light sensitive layer; and
   h. electroplating a thin layer of metal on said electrically conducting material from step (g) to physically conform to said grating means.

3. The method as claimed in claim 1 in which said reinforcing step (f) comprises:
   i. mounting said thin layer of metal on a rigid support member and securing it thereto so that said first and second grating means in said layer of metal are exposed to enable said grating master to be used as an embossing tool.

4. A method of producing a diffraction grating master capable of producing superimposed diffraction gratings comprising the steps of:
   a. exposing a plurality of first grating patterns on a light sensitive layer in conformance with a predetermined code;
   b. processing said light sensitive layer from step (a) to physically form a plurality of first gratings in said light sensitive layer corresponding to said plurality of first grating patterns;
   c. exposing a plurality of second grating patterns on said light sensitive layer from step (b) in conformance with said code;
   d. processing said light sensitive layer from step (c) to physically form a plurality of second gratings in said light sensitive layer corresponding to said plurality of second grating patterns;
   e. depositing a thin layer of material on said layer from step (d) to physically conform to said pluralities of first and second gratings on said light sensitive layer; and
   f. reinforcing said thin layer of material from step (e).

5. The method as claimed in claim 4 in which said depositing step (e) comprises:
   g. depositing a submicron layer of electrically conducting metal on said light sensitive layer from step (d) to physically conform to said pluralities of first and second gratings thereon; and
   h. electroplating a thin layer of nickel on said electrically conducting metal from step (g) to form a composite layer which physically conforms to said pluralities of first and second gratings.

6. The method as claimed in claim 5 in which said reinforcing step (f) comprises:
   i. mounting said composite layer of metal from step (h) on a rigid support member so that said pluralities of first and second gratings are exposed to enable the resulting structure to be used as an embossing tool.

7. The method as claimed in claim 5 in which said electroplating step (h) comprises:
   i. mounting said light sensitive layer from step (g) in a frame means having a wall retaining said light sensitive layer on said frame means; and
   j. placing said frame means and light sensitive layer from step (i) in an electroplating bath to complete said electroplating and to enable said light sensitive layer to remain distortion free during said electroplating.

8. The method as claimed in claim 5 in which said electroplating step (h) comprises:
   i. mounting said light sensitive layer from step (h) in a planar frame means having an undercut peripheral wall contacting the perimeter of said light sensitive layer to retain it flat on said frame means; and
   j. placing said frame means with said light sensitive layer retained therein in an electroplating bath to electroplate said thin layer of nickel on said electrically conducting metal.

9. The method as claimed in claim 4 in which said depositing step (e) comprises:
   g. depositing a submicron layer of electrically conducting material on said light sensitive layer from step (d) to physically conform to said pluralities of first and second gratings;
   h. depositing a thin layer of nickel over said electrically conducting material from step (g) to physically conform to said pluralities of first and second gratings; and
   i. depositing a thin layer of copper over said layer of nickel from step (h) to form a composite nickel/copper layer.

10. The method as claimed in claim 9 in which said reinforcing step (f) comprises:
    j. separating said composite nickel/copper layer of step (i) from said light sensitive layer;
    k. tinning a surface of a rigid support member to apply a thin coating of solder thereto;
    l. placing said composite nickel/copper layer from step (j) without being tinned on said coating of solder so that the layer of copper of said composite nickel/copper layer faces said coating of solder and pressing said composite nickel/copper layer thereagainst while applying heat to said support member to melt said thin coating of solder and thereby solder said composite nickel/copper layer to said support member at a working temperature below 500° F to enable the resulting structure produced thereby to be used as an embossing master.

11. The method as claimed in claim 4 in which said reinforcing step (f) comprises:
  g. tinning a surface of said rigid support member to apply a thin coating of solder thereto;
  h. placing said thin layer of material from step (f) on said coating of solder and pressing it thereagainst while applying heat to said support member to melt said thin coating of solder and thereby solder bond said thin layer of material to said support member at a working temperature below 500° F.

* * * * *